(12) United States Patent
Liu

(10) Patent No.: US 8,914,293 B2
(45) Date of Patent: Dec. 16, 2014

(54) WEB BROWSER IMPLEMENTATION OF INTERACTIVE VOICE RESPONSE INSTRUCTIONS

(75) Inventor: Kim Quo-That Liu, Foster City, CA (US)

(73) Assignee: Unwired Planet, LLC, Reno, NV (US)

( * ) Notice: Subject to any disclaimer, the term of this patent is extended or adjusted under 35 U.S.C. 154(b) by 427 days.

(21) Appl. No.: 12/868,050

(22) Filed: Aug. 25, 2010

(65) Prior Publication Data

US 2012/0053947 A1 Mar. 1, 2012

(51) Int. Cl.
*G10L 21/00* (2013.01)
*G06F 17/30* (2006.01)
*H04M 3/493* (2006.01)

(52) U.S. Cl.
CPC ..... *G06F 17/30899* (2013.01); *H04M 2207/40* (2013.01); *H04M 3/4938* (2013.01)
USPC .............................. 704/270; 704/1; 704/270.1

(58) Field of Classification Search
USPC .................. 704/1, 9, 10, 270, 270.1
See application file for complete search history.

(56) References Cited

U.S. PATENT DOCUMENTS

| 7,487,440 | B2 * | 2/2009 | Gergic et al. ................ 715/234 |
|---|---|---|---|
| 2004/0128136 | A1 * | 7/2004 | Irani ........................... 704/270.1 |
| 2005/0249191 | A1 * | 11/2005 | Birch et al. ................. 370/352 |
| 2006/0025997 | A1 * | 2/2006 | Law et al. .................... 704/257 |
| 2006/0095268 | A1 * | 5/2006 | Yano et al. ................... 704/275 |
| 2007/0047719 | A1 * | 3/2007 | Dhawan et al. ............... 379/235 |
| 2007/0053346 | A1 | 3/2007 | Bettis et al. |
| 2007/0150902 | A1 | 6/2007 | Meyer et al. |
| 2008/0228495 | A1 * | 9/2008 | Cross et al. ................... 704/275 |
| 2009/0271199 | A1 * | 10/2009 | Agapi et al. ................. 704/251 |

\* cited by examiner

*Primary Examiner* — Douglas Godbold

(57) ABSTRACT

Web browser implementable instructions are generated from interactive voice instructions that are not natively interpreted by web browsers. Generating web browser implementable instructions in this manner allows for faster and cheaper deployment of voice, video, and/or data services by allowing legacy services based on interactive voice instructions to function seamlessly within an all data network.

21 Claims, 5 Drawing Sheets

# WEB BROWSER IMPLEMENTATION OF INTERACTIVE VOICE RESPONSE INSTRUCTIONS

BACKGROUND

Modern telecommunication services offer a variety of ways to facilitate interactions between users and computers. As one example, interactive voice response (IVR) technology allows computers to process interactions with audio signals, for example, from human voices and standard telephone signaling (e.g., DTMF). IVR is typically used for automated attendants, which accept voice or telephone signaling inputs to navigate menu selections.

IVR services are typically implemented using an interactive voice specification. Voice extensible markup language (VXML) is one example of an interactive voice specification. VXML services are typically processed by interpreters in order to provide audio, verbal, and/or touch-tone interaction with users. However, VXML is not natively interpreted in hypertext markup language (HTML)/ECMAScript interpreters that are used, for example, by web browsers. Rather, VXML interpreters are typically implemented on separate hardware devices designated as media servers. Unfortunately, the number of concurrent service requests that can be handled by media servers are limited because media processing can consume considerable processing capacity and resources in real-time. Conventional VXML system architectures which use media servers are only scalable by physically adding more media servers to process more user service requests.

SUMMARY

Embodiments of a telecommunication system are described in which browser implementable instructions are generated from interactive voice instructions that are not natively interpreted by web browsers. As one example, HTML/ECMAScript instructions are generated to implement functionality specified by a VXML application. In some embodiments, the telecommunication system provides a transition mechanism for legacy VXML-based services to an all data network without the use of conventional intermediate media server components. Other embodiments of the system are also described. Embodiments of various system components and various methods of operation are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
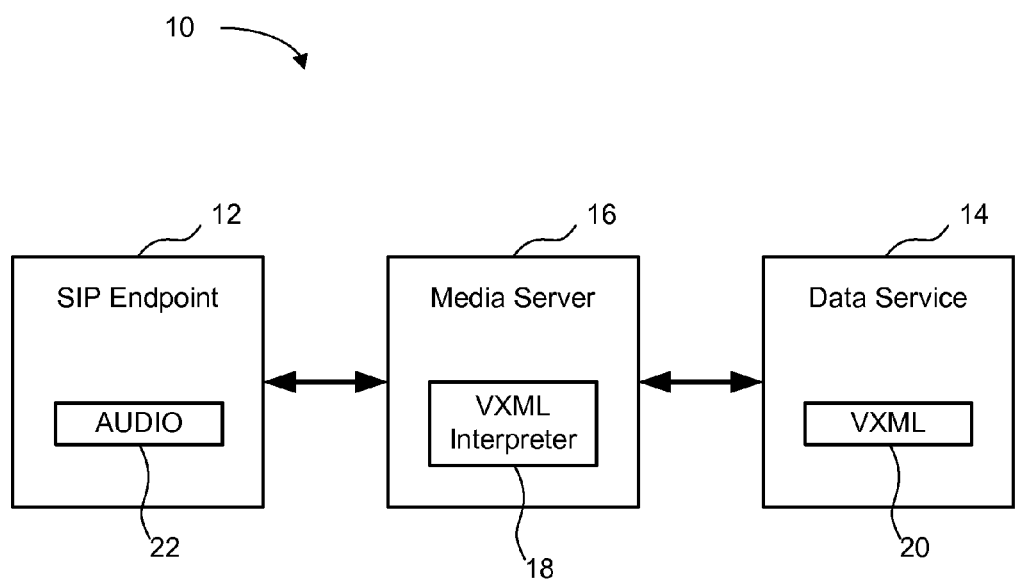
FIG. 1 depicts a schematic diagram of one embodiment of a conventional communication system which bridges telephony and data services.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments include functionality which converts interactive voice instructions that are not natively interpreted by web browsers into browser implementable instructions that can be directly interpreted by web browsers. As used herein, the process of converting interactive voice instructions into web browser implementable instructions can include any number of operations, directly or indirectly, to generate the web browser implementable instructions based on the interactive voice instructions.

One example of interactive voice instructions includes VXML instructions, which include programming code or scripting according to the VXML standards. Other embodiments may use other types or versions of interactive voice instructions which specify how to implement interactive voice operations for an interactive voice response (IVR) system.

One example of web browser implementable instructions includes HTML/ECMAscript instructions, which includes programming code or scripting according to the HTML and ECMAscript standards. Other embodiments may use other type or versions of web browser implementable instructions which can be implemented directly by an interpreter for a web browser.

In some embodiments, the telecommunication system for converting interactive voice instructions into web browser implementable instructions is implemented without a conventional media server. Instead of using a conventional media server, the interactive voice instructions are converted at the service provider's location, and the web browser implementable instructions are sent directly to the end user's device. Alternatively, the interactive voice instructions may be sent from the service provider to the end user's device, and the end user's device may include an instruction converter to convert the interactive voice instructions to the web browser implementable instructions. In some embodiments, this conversion facilitates performing much of the media processing at the end user's device, which may relieve processing resources at the service provider's location.

FIG. 1 depicts a schematic diagram of one embodiment of a conventional communication system 10 which bridges telephony and data services. The illustrated communication system 10 includes a telephony endpoint 12 and a data endpoint 14. The telephony endpoint 12 is coupled to the data endpoint 14 via a media server 16.

In general, the telephony endpoint 12 provides telephony services to an end user. Some examples of conventional telephony endpoints include cellular devices, smart phones, gateways, computers, and so forth. For purposes of this description, the illustrated telephony endpoint 12 is designated as a SIP-enabled endpoint (or simply SIP endpoint) because the telephony endpoint 12 is capable of implementing telephony services using one type of telephony signaling protocol called session initiation protocol (SIP). In general, SIP is an application-layer control protocol for managing telecommunication sessions between end users. The telephony endpoint 12 uses SIP to manage telephony communications with other devices. In the illustrated embodiment, the telephony endpoint 12 uses SIP to manage audio data which uses a standardized packet format according to the real-time transport protocol (RTP).

In contrast to the telephony endpoint 12, the data endpoint 14 provides data services other than the audio/video telephony services. As one example, the data endpoint 14 may provide internet data to a user via an internet browser on the user's mobile device. In the illustrated embodiment, the data endpoint 14 uses hypertext transfer protocol secure (HTTP (S)) in conjunction with hypertext markup language (HTML) for the data communications.

The media server 16 provides an interface between the telephony services and the data services and, more specifically, between the telephony endpoint 12 and the data endpoint 14. Although designated as a media server, the illustrated media server 16 is representative of any type of intermediate component(s) which implements functionality to bridge the telephony services and the data services.

In the illustrated embodiment, the media server 16 includes an interpreter 18 to facilitate implementation of an interactive voice response (IVR) system. In general, the interpreter 18 converts interactive voice instructions 20 from a data service 14 to generate audio 22 at the telephony endpoint 12. In a specific embodiment, the interactive voice instructions 20 are VXML instructions, and the interpreter 18 is a VXML interpreter.

While the inclusion of the media server 16 in the conventional communication system 10 provides bridging functionality, the use of the media server 16 also results in specific limitations on the implementation of the conventional communication system 10. The use of a media server, or other intermediate component, between the telephony and data services increases system cost and complexity. As a specific example, implementations which use a media server are constrained in terms of scalability. In some embodiments, use of the media server 16 complicates the implementation of the conventional communication system 10 simply because the number of system components is increased. In other embodiments, the media server 16 has limited functionality because the media server 16 has limited ability to transfer communications between the telephony and data domains.

Figure 2:
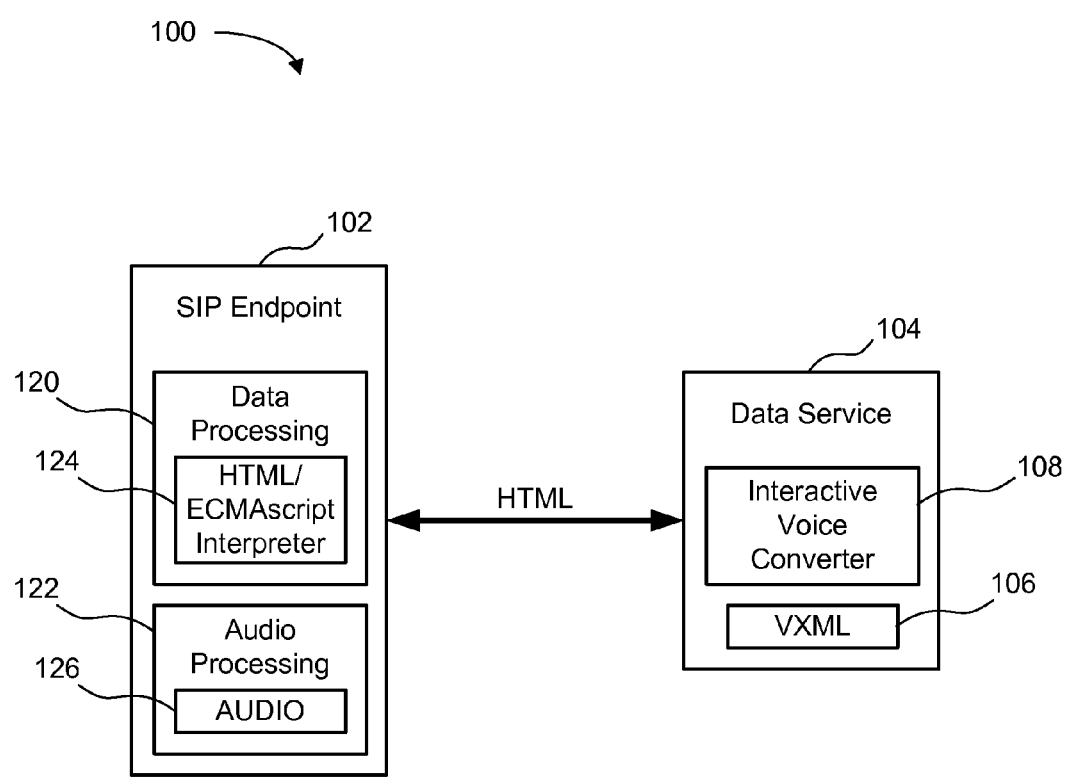
FIG. 2 depicts a schematic diagram of one embodiment of a communication system which transitions VXML-based services to data services that can be implemented directly by web based data processing.

FIG. 2 depicts a schematic diagram of one embodiment of a communication system 100 which transitions VXML-based services to data services that can be implemented directly by web based data processing. The illustrated communication system 100 includes a telephony endpoint 102 and a data endpoint 104. Although the communication system 100 is shown and described with certain components and functionality, other embodiments of the communication system may include fewer or more components to implement less or more functionality.

For purposes of this description, the illustrated telephony endpoint 102 is designated as a SIP-enabled endpoint (or simply SIP endpoint) because the telephony endpoint 102 is capable of implementing telephony services using SIP. However, in other embodiments, the telephony endpoint 102 may implement one or more other telephony signaling protocols and/or standards instead of, or in addition to, SIP. Some examples of other standards include, but are not limited to, media gateway control protocol (H.248), global system for mobile communications (GSM), and integrated services digital network (ISDN).

In the illustrated embodiment, the data endpoint 104 uses HTTP(S) in conjunction with hypertext markup language (HTML) for the data communications. However, in other embodiment, the data endpoint 104 may use other protocols for the data communications. As one example, the data endpoint 104 may use the extensible messaging and presence protocol (XMPP). Other embodiments may use other protocols or services such as file transfer protocol (FTP), internet message access protocol (IMAP), post office protocol (POP), and simple mail transfer protocol (SMTP).

In many ways, the telephony endpoint 102 is similar to the telephony endpoint 12 of FIG. 1, and the data endpoint 104 is similar to the data endpoint 14 of FIG. 1. However, the data endpoint 104 of FIG. 2 is different from the data endpoint 14 of FIG. 1 in at least one way because the data endpoint 104 is capable of converting interactive voice instructions to web browser implementable instructions. In particular, the data endpoint 104 includes an interactive voice converter 108 which implements the operations to convert the interactive voice instructions to web browser implementable instructions. In an alternative embodiment shown in FIG. 3, the telephony endpoint 102, rather than the data endpoint 104, is capable of converting the interactive voice instructions to web browser implementable instructions.

By converting the interactive voice instructions to web browser implementable instructions, the media server used in conventional implementations may be omitted. The exclusion of a media server simplifies the creation and deployment of new services by more readily facilitating scalability of the telephony and data services. This allows for faster and cheaper deployment of voice, video, and/or data services by allowing legacy services using interactive voice instructions to function seamlessly within an all data network without the need for specific voice protocols.

In order to process the web browser implementable instructions generated by the interactive voice converter 108 at the data endpoint 104, the telephony endpoint 102 includes data processing components 120 and audio processing components 122. In one embodiment, the data processing components 120 include an interpreter 124 to interpret the web browser implementable instructions. As one example, the interpreter 124 may be a HTML/ECMAscript interpreter. Additionally, the interpreter 124 may be implemented in conjunction with a web browser (see FIG. 4). To the extent that some of the web browser implementable instructions call for generation of audio signals, the data processing components 120 may send corresponding digital signals to the audio processing components 122 for generation of audio 126. However, in some embodiments, some or all of the audio signals indicated in the VXML instructions 106 are converted to web browser implementable instructions which do not include generation of audio signals.

Figure 3:
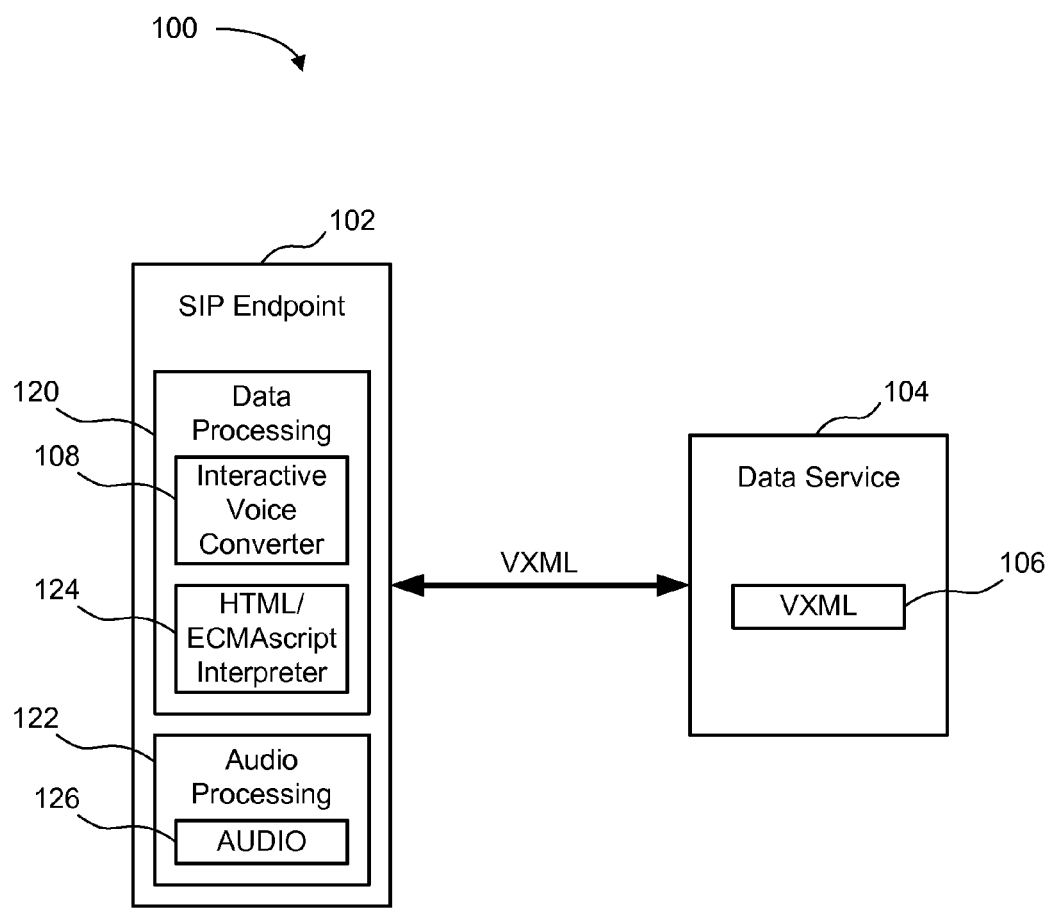
FIG. 3 depicts a schematic diagram of another embodiment of the communication system of FIG. 2 in which the functionality of the interactive voice converter is implemented at the telephony endpoint.

FIG. 3 depicts a schematic diagram of another embodiment of the communication system of FIG. 2 in which the functionality of the interactive voice converter 108 is implemented at the telephony endpoint 102. In this embodiment, rather than converting the interactive voice instructions 106 at the data endpoint 104, the interactive voice instructions 106 are sent directly or indirectly to the telephony endpoint 102 for conversion at the telephony endpoint 102. In other embodiments, the interactive voice instructions 106 may be sent to an intermediate device (not shown) between the data endpoint 104 and the telephony endpoint 102 which performs the conversion.

Figure 4:
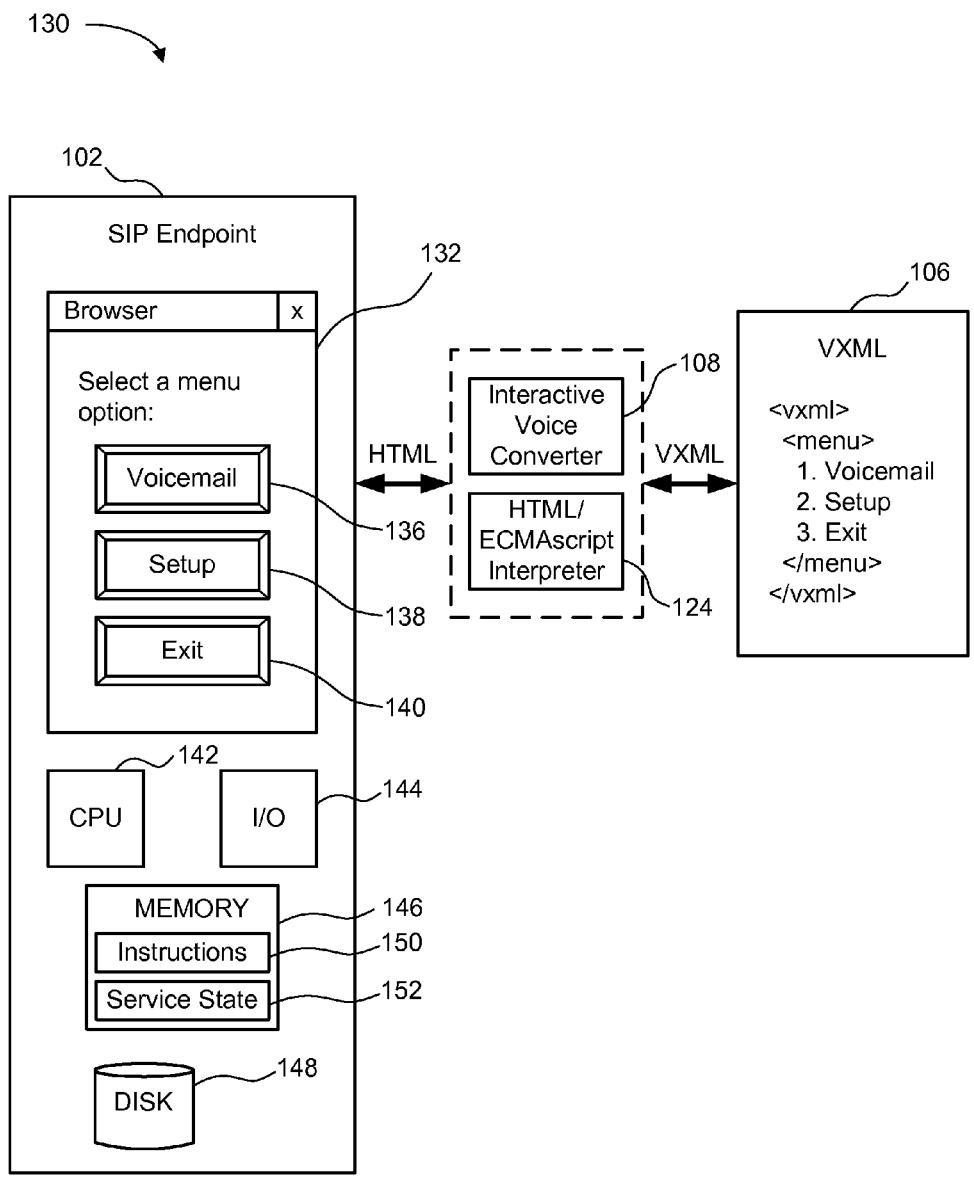
FIG. 4 depicts a schematic diagram of one embodiment of a process for transitioning from VXML-based services to data services that can be implemented directly by a web browser.

FIG. 4 depicts a schematic diagram of one embodiment of a process 130 for transitioning from VXML-based services to data services that can be implemented directly by a web browser 132. In the illustrated embodiment, the web browser 132 is implemented by a display in the telephony endpoint 102.

For convenience in describing the process 130 of FIG. 4, the interactive voice converter 108 and the HTML/ECMAscript interpreter 124 are shown separately from the telephony endpoint 102. However, as described above, in some embodiments the HTML/ECMAscript interpreter 124 is implemented in conjunction with web browser 132 of the telephony endpoint 102. Additionally, the interactive voice converter 108 also may be implemented at the telephony endpoint 102, as described above with reference to FIG. 3. Alternatively, the interactive voice converter 108 may be implemented at the data endpoint 104, as described above with reference to FIG. 2.

In one embodiment, the VXML 106 is loaded into the interactive voice converter 108 in response to an access request. Based on the parameters and the type of service invocation request, the interactive voice converter 108 loads the original VXML 106 used to provide the requested service. The VXML 106 can be partially or completely loaded into the interactive voice converter 108. In some embodiments, sequentially loading partial sections of the VXML 106 may be more efficient so that the interactive voice converter 108 can quickly start converting some of the VXML 106 into HTML/ECMAscript while other some or all of the remaining partial sections of the VXML 106 are subsequently loaded into the interactive voice converter 108. In other embodiments, it may be useful to load all of the VXML 106 into the interactive voice converter 108 at once, so that the entire VXML 106 scripting can be stored at and quickly accessed by the interactive voice converter 108.

It should be noted that in some embodiments, while the interactive voice converter 108 processes the VXML 106 in order to generate the corresponding HTML/ECMAscript, the interactive voice converter 108 does not actively provide the requested service to the end user. This is different from conventional VXML interpreters implemented in media services (see FIG. 1) which actively provide the requested service to the end user. Rather, the interactive voice converter 108 translates, or converts, the VXML 106 into the HTML/ECMAscript, which is provided to the HTML/ECMAscript interpreter 124. The actual service is actively provided to the end user by the HTML/ECMAscript interpreter 124 which is implemented, for example, in conjunction with the web browser 132. Various components at the data endpoint 104 and/or the telephony endpoint 102 may or may not cache or store the results of the conversion of the VXML 106 to the HTML/ECMAscript for re-use and/or re-issue to future requests. If the results are not stored, then the same or similar conversion occurs with each request. It should be noted that a subsequent conversion may occur even while previously generated HTML/ECMAscript is running on the end user device.

In some embodiments, the interactive voice converter 108 allows service providers to remove the media servicer component form the service implementation. Although the interactive voice converter 108 implements some or all of the same functionality as a conventional media server, implementations of the interactive voice converter 108 have better scalability then conventional media servers because the interactive voice converter 108 is not actively providing the service to the end user. This results in better scalability because the processing of media files and the VXML 106 is essentially offloaded to the HTML/ECMAscript interpreter 124, which is typically implemented on the end user telephone device 102.

In the illustrated embodiment, the VXML 106 is shown using pseudocode to implement an interactive voice menu with three selection options: 1) access voicemail, 2) access account setup, and 3) exit the interactive voice system. Although pseudocode is shown, the depicted pseudocode is not indicative of actual scripting language that might be used to implement the indicated interactive voice menu. Any form of interactive voice programming code or scripting may be used to implement the interactive voice menu or other interactive voice operations.

Once the VXML 106 is loaded into the interactive voice converter 108, the interactive voice converter 108 analyzes the VXML 106. The interactive voice converter 108 can analyze the VXML 106 for a variety of structures, patterns, parameters, and other characteristics. In one embodiment, the interactive voice converter 108 analyzes the VXML 106 to identify standard service elements such as the depicted menu elements. The interactive voice converter 108 uses this analysis to generate HTML/ECMAscript that implements some or all of the functionality specified by the corresponding section(s) of the VXML 106. The interactive voice converter 108 then sends the generated HTML/ECMAscript to the HTML/ECMAscript interpreter 124. If the interactive voice converter 108 is located at the data endpoint 104, then the interactive voice converter 108 may coordinate transmission of the generated HTML/ECMAscript to the telephony endpoint 102. Otherwise, if the interactive voice converter 108 is located at the telephony endpoint 102, then there is no need for further transmissions between the data endpoint 104 and the telephony endpoint 102.

Once the HTML/ECMAscript is at the HTML/ECMAscript interpreter 124, the HTML/ECMAscript interpreter 124 processes the HTML/ECMAscript to implement the specified operations. In some embodiments, the HTML/ECMAscript is designed to implement substantially the same functionality as specified by the VXML 106. In other embodiments, the HTML/ECMAscript is designed to implement different, but complementary functionality to some or all of the operations specified by the VXML 106.

In the illustrated embodiment, the HTML/ECMAscript is generated and executed to implement graphical menu buttons which correspond to the interactive voice menu elements. Specifically, the HTML/ECMAscript is executed by the web browser 132 to display a voice button 136, a setup menu button 138, and an exit menu button 140, which respectively correspond to the voicemail, setup, and exit menu elements of the VXML 106. Additionally, the HTML/ECMAscript also generates an introductory instructional phrase "Select a menu option:" to provide written instructions that might otherwise have been generated audibly by execution of the VXML 106.

In this way, the web browser 132 is able to implement equivalent or complementary functionality to the operations that are specified by the VXML 106. Where applicable, the interactive voice converter 108 may generate supplementary HTML/ECMAscript instructions to improve execution of the functionality on a different platform (e.g., web) other than the interactive audio platform originally intended for use with the VXML 106. Alternatively, the interactive voice converter 108 may omit certain functionality from the VXML 106 that is not compatible with the new platform that will execute the generated HTML/ECMAscript. For example, the HTML/ECMAscript may omit certain tonal signals that are not necessary or are deemed trivial or distracting from a visual representation of the remaining VXML functionality. Furthermore, the interactive voice converter 108 may use the same, a similar, or a different organization structure for the HTML/ECMAscript than is inherent in or specified by the VXML 106, depending on the type of new platform that is implemented, the type of functionality that can feasibly or efficiently be implemented by the new platform, and/or the type of functionality that is specified by the VXML 106.

The illustrated telephony endpoint 102 also one or more typical electronic components, including a processor (CPU) 142, one or more input/output (I/O) devices 144, an electronic data memory device 146, and a disk storage device 148. Although the telephony endpoint 102 is shown and described with certain typical electronic components and functionality, other embodiments of the telephony endpoint may include fewer or more typical electronic components to implement less or more functionality.

In one embodiment, the processor 142 implements functionality to make the telephony endpoint 102 operational. The processor 142 may be any type of data processing device or system, including one or more processing cores, integrated memory, and/or other typical components. In one embodiment, the processor 142 executes instructions that are stored on local memory within the processor 142, on the memory device 146, and/or on the storage device 148. Some of the operational instructions that may be executed by the processor 142 are shown within the context of the memory device 146. However, in other embodiments, some or all of the illustrated and described instructions may be stored on another device or stored in a distributed manner on a plurality of devices. Additionally, in some embodiments at least a portion of the described operations may be implemented by other hardware components that are not shown in the simplified illustration of FIG. 4.

In one embodiment, the I/O devices 144 include one or more typical user input devices (e.g., a microphone, keypad, touch screen, etc.) so that a user can input information into the telephony endpoint 102. Similarly, the I/O devices 144 include one or more typical user output devices (e.g., a display screen, light indicators, speaker(s), etc.) so that the telephony endpoint 102 can convey information to the user. The I/O devices 144 also include communication devices (e.g., network interface components) to facilitate telephony and/or data communications between the telephony endpoint 102 and other communications devices such as the data endpoint 104, other telephony endpoints, and other networking nodes and resources within the communication network 100.

In one embodiment, the memory device 146 and the storage device 148 are representative of any type of memory or storage device that can be used to store functional or non-functional data. The memory device 146 and the storage device 148 may be accessed by the processor 142 (or other intermediate data access devices) for typical data operations including read and write operations. In one embodiment, the processor 142 reads instructions from the memory device 146 and/or the storage device 148 in order to execute those instructions and provide general and specific operability to the telephony endpoint 102.

In the illustrated embodiment, the memory device 146 includes software instructions 150, or program code, that can be accessed and executed by the processor 142. Additionally, the memory device 146 may store service state information 152, which is described in more detail below. Other embodiments may include more or less functionality, or substantially equivalent functionality in the form of different protocols, instructions, and/or procedures.

Although not shown in FIG. 4 for the sake of simplicity, similar typical electronic components may be implemented with or coupled to the data endpoint 104. Specifically, the data endpoint 104 may include a processor, one or more I/O devices, a memory device, and a disk storage device, as well as other typical electronic components.

Figure 5:
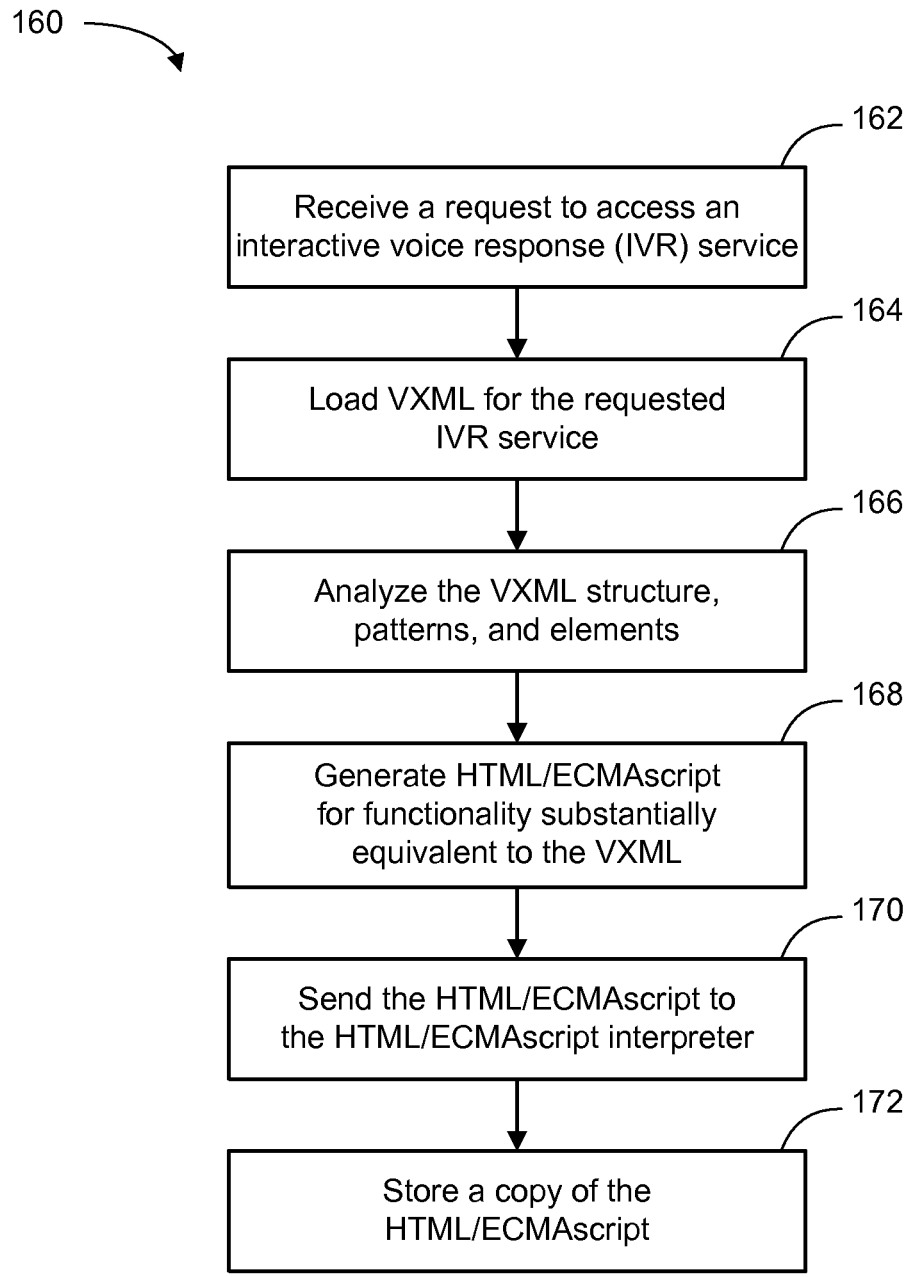
FIG. 5 depicts a flow chart diagram of one embodiment of a method for operating the interactive voice converter of FIG. 2.

FIG. 5 depicts a flow chart diagram of one embodiment of a method 160 for operating the interactive voice converter of FIG. 2. Although the method 160 is described in conjunction with the communication system 100 of FIG. 2 and the process 130 of FIG. 4, embodiments of the method 160 may be implemented with other types of communication systems and processes.

At block 162, the interactive voice converter 108 receives a request to access and interactive voice response (IVR) service. In response to the request, at block 164 the interactive voice converter 108 loads the VXML 106 for the requested IVR service. As described above, the interactive voice converter 108 may load some or all of the corresponding VXML 106.

At block 166, the interactive voice converter 108 then analyzes the VXML structure, patterns, and service elements. This analysis allows the interactive voice converter 108 to determine which structures, patterns, and service elements are compatible with the standards for the web browser implementable instruction set (e.g., HTML/ECMAscript). In particular, this analysis allows the interactive voice converter 108 to determine which structure from the VXML 106 can be implemented by the HTML/ECMAscript, and which structures from the VXML 106 can be disregarded and omitted from the HTML/ECMAscript. As a result, at block 168 the interactive voice converter 108 is capable of generating HTML/ECMAscript that is substantially equivalent to the functionality specified by the VXML 106, to the extent that similar functionality is compatible and/or appropriate in the new deployment platform (e.g., web browser 132).

After some or all of the HTML/ECMAscript is generated by the interactive voice converter 108, at block 170 the interactive voice converter 108 facilitates transmission of the generated HTML/ECMAscript to the HTML/ECMAscript interpreter 124 (e.g., at the end user telephony device 102). Additionally, in some embodiments, at block 172 the interactive voice converter 108 stores a copy of the HTML/ECMAscript for subsequent reference or use. The depicted method 160 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Additionally, some of the operations shown in the illustrated method(s), and the order of the illustrated method(s), are merely representative of one embodiment. Actual implementations of the method(s) in commercialized or other device may vary with more or less detail or other operations from the representative embodiments described herein.

The following description provides additional details regarding various features that may be implemented, separately or in combination, with one or more of the embodiments described above.

In some embodiments, the interactive voice converter 108 provides for the conversion of the VXML 106 to HTML/ECMAscript in order to intelligently generate a visual (i.e., HTML) representation of the service described by the VXML 106. The visual representation may be implemented instead of, or in addition to, the audio, verbal, and/or touch-tone representation(s) described by the VXML 106. Some embodiments detect the structure of the documentation for the VXML 106 by, for example, detecting the layout and relationship between service elements. The interactive voice converter 108 uses the detected structural context to generate the HTML. Additional rules or context may be provided by an end user or by a service provider of the VXML service to aide in generating the resulting HTML/ECMAscript from the VXML 106. As one example, a cascading style sheet may be specified for use in formatting the resulting HTML.

In some embodiments, the interactive voice converter 108 processes the VXML 106 and examines the elements within the VXML 106 for indications of service structure such as, for example, the relationship between menus and/or menu elements. The interactive voice converter 108 also tries to recognize service patterns which may be supplied, for example, to the interactive voice converter 108 via a configuration file. As one example within the context of a voicemail service, when a user request reaches the voicemail service, the voicemail service may either allow the user to attempt to log into the voicemail service as a recognized user or allow the user to record a voice message to the voicemail service recipient. Embodiments of the interactive voice converter 108 may, depending on a supplied configuration, look for such common service patterns specifically. When such service patterns are recognized, then appropriate textual labels (in a language specified in the configuration file) or other graphical elements may be added to or specified by the resulting HTML/ECMAscript. These textual labels and/or graphical elements might otherwise not be present in or specified by the source VXML 106. As one example, at textual label of "Voicemail Login" might be added as a title tag of a header tag of the generated HTML document, even there is no title tag in the corresponding source VXML 106.

In some embodiments, the interactive voice converter 108 may be used to make voice-based services (e.g., voicemail or voice menu services) accessible to hearing impaired users by rendering the voice service in a visual format.

As described above, some embodiments facilitate removal of legacy media server components by instead rendering the VXML 106 into HTML/ECMAscript to be sent to an end user device. The end user device can then process the HTML/ECMAscript within a web browser on the end user device without the need for a media server. In this way, embodiments of the interactive voice converter 108 provide a user-friendly HTML/ECMAscript representation of the VXML 106 in an automated fashion in order to allow for transition from traditional voice, video, and/or data services by allowing legacy VXML based services to function seamlessly within an all data network, without the need for specific voice protocols. In further embodiments, the interactive voice converter 108 provides a generic conversion system to function with minimal adaptation to provide a transition mechanism for legacy services based on the VXML 106 to an all data network, without the use of a media server or media server components. The actual media processing (e.g., voice, audio, and/or video) are replaced by or converted to equivalent HTML/ECMAscript that is implemented by the HTML/ECMAscript interpreter 124 (e.g., within the web browser 132 of the end user device).

As described above, embodiments of the communication system 100 using the interactive voice converter 108 can achieve a more scalable service architecture than communication systems which use conventional media servers (see FIG. 1) because the active service processing is performed by the end user's device. Consequently, rather than suffering additional resource consumption by the addition of new users, the addition of each end user essentially increases the processing capacity of the overall system because each end user provides a quantum of processing resources and capacity at the end user's own device. The service provider only provides, in one embodiment, the conversion of the VXML 106 to HTML/ECMAscript, the results of which may be partially or wholly cached/reused for the same or different end users for even more improvement in performance. In another embodiment, the service provider only provides the VXML 106 to the end user for conversion at the end user's device, in which case the generated HTML/ECMAscript may be furnished back to the service provider for caching and/or re-use. In this way, the processing-intensive media processing is distributed for each end user to the HTML/ECMAscript interpreter 124 on that end user's device.

In further embodiments, the HTML/ECMAscript interpreter 124 may be implemented by other devices, other than the end user's telephony endpoint 102. Although the above description references telephony devices, embodiments of the HTML/ECMAscript interpreter 124 may be implemented as embedded applications within devices such as, but not limited to, cable converter boxes, wireless routers, and other customer premises equipment.

Embodiments of the invention described herein make it possible for traditional telephony networks to be subsumed into an all data network. In some embodiments, removing specialized domain bridging devices such as a media server from the communication system simplifies service creation and provisioning.

Embodiments of the invention, or portions thereof, can take the form of an entirely hardware embodiment, an entirely software embodiment (in which the software is stored on and/or executed by hardware components), or an embodiment containing both hardware and software elements. In one embodiment, the invention is implemented in software, which includes but is not limited to firmware, resident software, microcode, etc.

Some embodiments described herein include at least one data processing device coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Some or all of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform some or all of the operations described herein Furthermore, embodiments of the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. In a specific embodiment, the computer-usable or computer-readable medium is a physical storage medium on which the program code is stored.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
a processor to implement operations for a service of an interactive voice response (IVR) system; and
a memory device to store conversion instructions for an interactive voice converter;
wherein the processor is configured to implement the interactive voice converter based on at least some of the conversion instructions;
wherein the interactive voice converter is configured to generate, based on instructions for the service of the interactive voice response system that are not natively interpreted by a web browser, web browser implementable instructions that are natively implemented by the web browser and to provide the web browser implementable instructions to a web browser on an end user device to provide the service to an end user, wherein the end user is a user of the service at the end user device.

2. The system of claim 1, wherein the instructions for the service of the interactive voice response system comprise VXML instructions.

3. The system of claim 1, wherein the instructions for the service of the interactive voice response system are stored at an interactive voice source device, and the interactive voice source device is configured to transmit the generated web browser implementable instructions to the end user device.

4. The system of claim 1, wherein the instructions for the service of the interactive voice response system are stored at the end user device, and the end user device is configured to receive said instructions from an interactive voice source device.

5. The system of claim 4, wherein the end user device comprises a display device, and the end user device is further configured to display a web browser on the display device, and the web browser is configured to generate, according to the web browser implementable instructions, a visual representation of the instructions for the service of the interactive voice response system.

6. The system of claim 1, wherein interactive voice converter is further configured to recognize service patterns of service elements within the instructions for the service of the interactive voice response system.

7. The system of claim 6, wherein interactive voice converter is further configured to generate the web browser implementable instructions to provide a visual representation of the instructions for the service of the interactive voice response system based on the service patterns of the service elements within said instructions.

8. The system of claim 1, wherein the memory device is further configured to store service state information, and the processor is further configured to access the stored service state information for subsequent processing of the instructions for the service of the interactive voice response system.

9. The system of claim 1, wherein the web browser implementable instructions are at least partially compatible with ECMAscript.

10. A method of implementing operations for a service of an interactive voice response (IVR) system, the method comprising:
receiving a request to access an interactive voice response service;
loading instructions for the service of the interactive voice response system that are not natively interpreted by a web browser;
generating, based on said instructions, web browser implementable instructions that are natively implemented by the web browser; and providing the web browser implementable instructions to a web browser on an end user device to provide the service to an end user, wherein the end user is a user of the service at the end user device.

11. The method of claim 10, wherein the instructions for the service of the interactive voice response system comprise VXML instructions.

12. The method of claim 10, further comprising:
generating the web browser implementable instructions at a service provider device at a service provider location; and
transmitting the web browser implementable instructions from the service provider device to the end user device at a user location.

13. The method of claim 12, wherein generating the web browser implementable instructions comprises:
recognizing service patterns of service elements within the instructions for the service of the interactive voice response system; and
generating web browser implementable instructions to provide a visual representation of the instructions for the service of the interactive voice response system based on the service patterns of the service elements within the interactive voice instructions.

14. The method of claim 12, further comprising:
storing service state information;
accessing the stored service state information for subsequent processing of the instructions for the service of the interactive voice response system.

15. The method of claim 10, further comprising:
receiving, from a service provider device at a service provider location, the web browser implementable instructions at the end user device at an end user location; and
processing the web browser implementable instructions at an instruction interpreter coupled to the end user device.

16. The method of claim 10, wherein the web browser implementable instructions are at least partially compatible with ECMAscript.

17. A computer program product comprising a non-transitory computer readable storage medium with program code stored thereon, wherein the program code, when executed by a processor, causes the computer processor to perform operations for a service of an interactive voice response (IVR) system, wherein the operations comprise:
implementing an interactive voice converter;
loading instructions for the service of the interactive voice response system that are not natively interpreted by a web browser; and
generating, based on said instructions, web browser implementable instructions that are natively implemented by the web browser; and
providing the web browser implementable instructions to a web browser on an end user device to provide the service to an end user, wherein the end user is a user of the service at the end user device.

18. The computer program product of claim 17, wherein the program code, when executed by the processor, causes the processor to perform further operations comprising:
recognizing service patterns of service elements within the instructions for the service of the interactive voice response system;
generating the web browser implementable instructions to provide a visual representation of the instructions for the service of the interactive voice response system based on the service patterns of the service elements within said instructions; and
transmitting the web browser implementable instructions from the service provider device to the end user device at a user location.

19. The computer program product of claim 17, wherein the program code, when executed by the processor, causes the processor to perform further operations comprising implementing the interactive voice converter on a service provider device at a service provider location.

20. The computer program product of claim 17, wherein the program code, when executed by the processor, causes the processor to perform further operations comprising implementing the interactive voice converter on the end user device at an end user location, wherein the end user device comprises a portable electronic device.

21. The computer program product of claim 17, wherein the web browser implementable instructions are at least partially compatible with ECMAscript.

* * * * *